US008638360B2

(12) United States Patent
Rovegno

(10) Patent No.: US 8,638,360 B2
(45) Date of Patent: Jan. 28, 2014

(54) PROCESS OF REAL TIME ADJUSTMENT OF THE SENSITIVITY OF A VIDEO IMAGE SENSOR OF A VIDEOENDOSCOPIC PROBE

(75) Inventor: Jean Rovegno, La Ciotat (FR)

(73) Assignee: Tokendo, La Ciotat (FR)

( * ) Notice: Subject to any disclaimer, the term of this patent is extended or adjusted under 35 U.S.C. 154(b) by 577 days.

(21) Appl. No.: 12/893,819

(22) Filed: Sep. 29, 2010

(65) Prior Publication Data
US 2012/0075443 A1    Mar. 29, 2012

(51) Int. Cl.
*H04N 7/18* (2006.01)

(52) U.S. Cl.
USPC .................................. 348/65; 348/E7.085

(58) Field of Classification Search
USPC .......................................................... 348/65
See application file for complete search history.

(56) References Cited

U.S. PATENT DOCUMENTS

| 4,280,133 | A * | 7/1981 | Kato ............................. 348/662 |
| 6,836,288 | B1 * | 12/2004 | Lewis ........................ 348/229.1 |
| 7,245,320 | B2 * | 7/2007 | Kaplinsky et al. ......... 348/229.1 |
| 2005/0270412 | A1 * | 12/2005 | Kamon et al. ................ 348/362 |

FOREIGN PATENT DOCUMENTS

| EP | 1 527 730 | 5/2005 | | |
| FR | 2 737 650 | 2/1997 | | |
| JP | 11-289530 | * 10/1999 | ............... H04N 7/18 |
| JP | 11289514 | 10/1999 | | |
| JP | 11289530 | 10/1999 | | |

* cited by examiner

*Primary Examiner* — Mehrdad Dastouri
*Assistant Examiner* — Nguyen Truong
(74) *Attorney, Agent, or Firm* — Seed IP Law Group PLLC

(57) ABSTRACT

A method adjusts the sensitivity of an image sensor, and includes: adjusting an integration duration of the image sensor between a minimum duration and an image frame duration, receiving from the image sensor a frame signal, and amplifying the frame signal by applying an adjusted amplification gain between different minimum and maximum gain values. For each frame of the frame signal, if an integration duration, calculated as a function of an average value of the frame signal, is comprised between the minimum duration and a maximum duration equal to several times the frame duration, the method establishes the integration duration at the integration duration calculated and maintains the amplification gain at a fixed value, otherwise it maintains the integration duration at the minimum or maximum duration and adjusts the amplification gain between the minimum and maximum values as a function of the average value.

35 Claims, 8 Drawing Sheets

Figure 1:
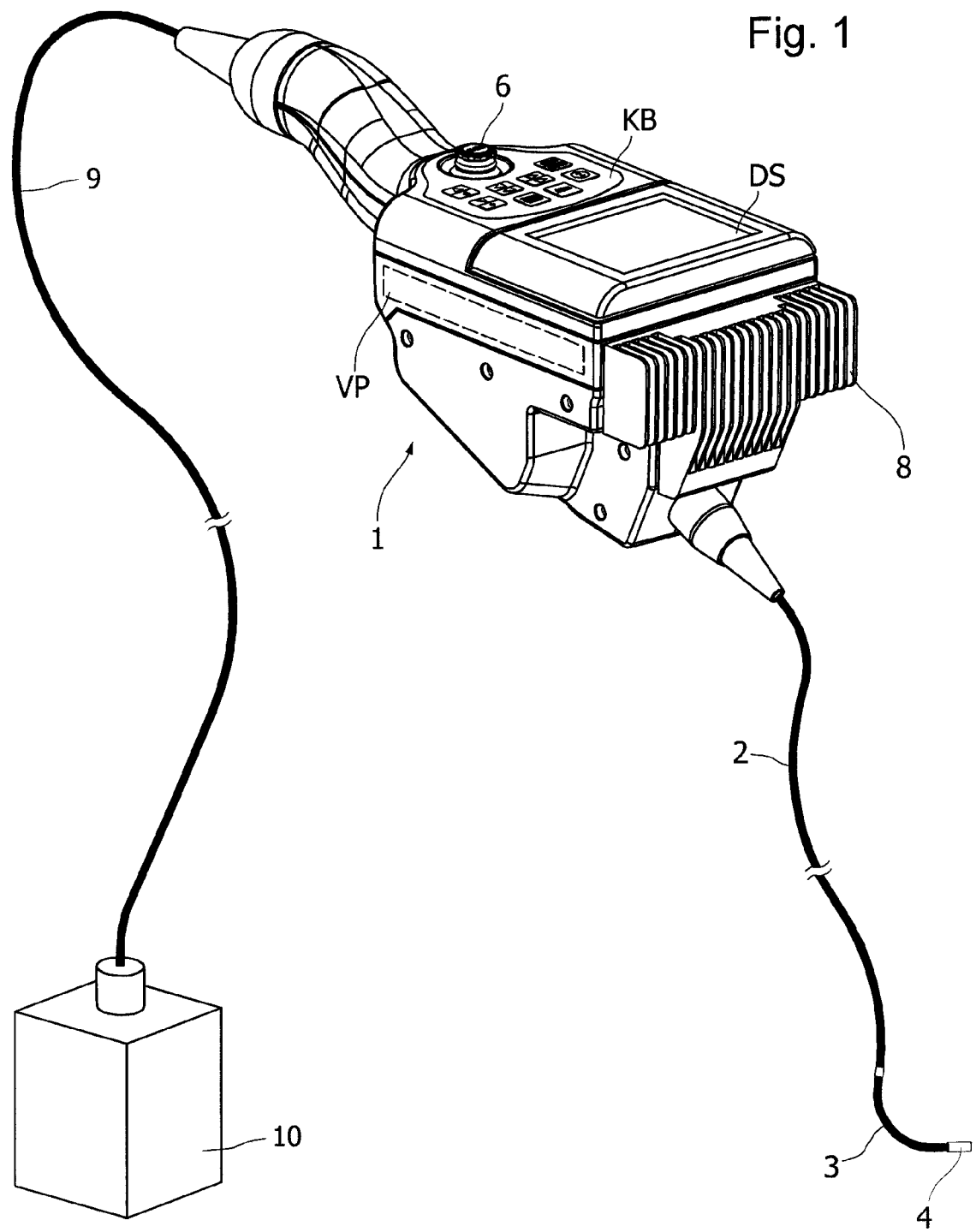

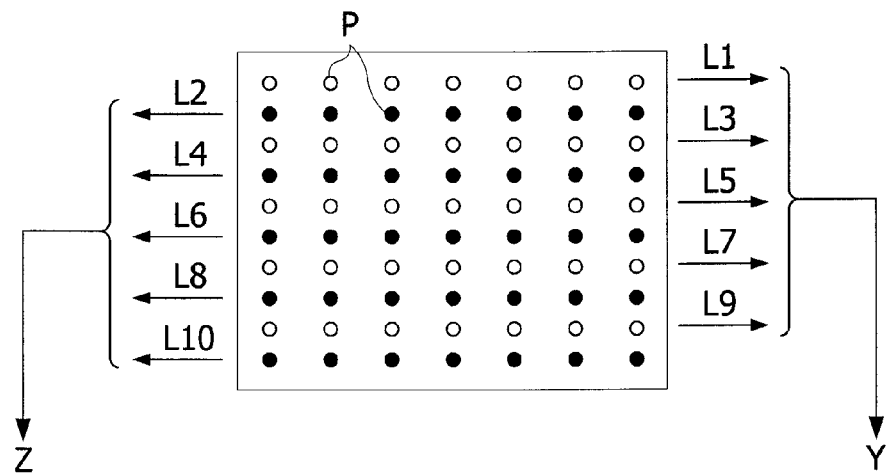
Fig. 3
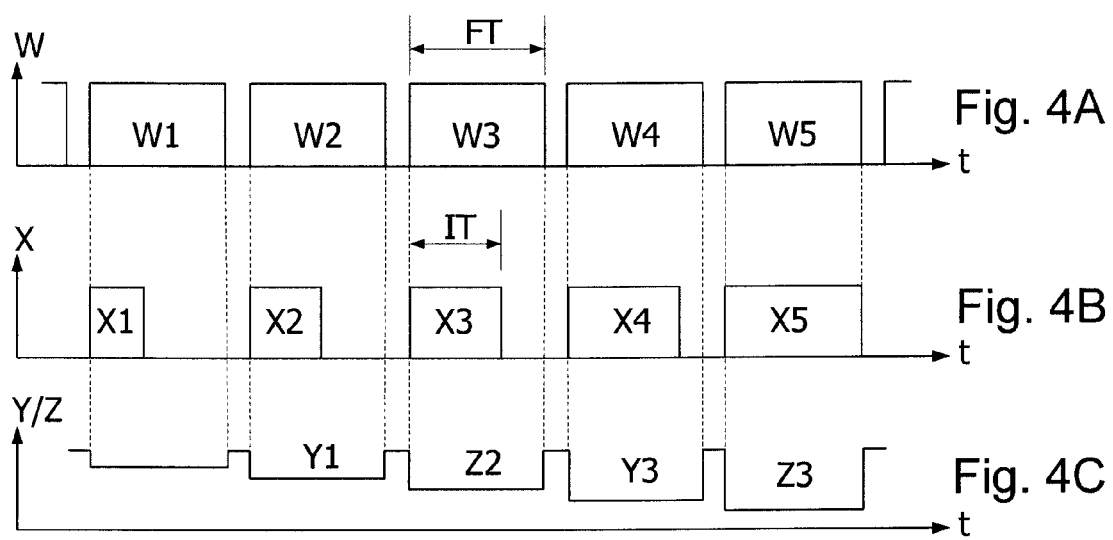
Fig. 4A
Fig. 4B
Fig. 4C

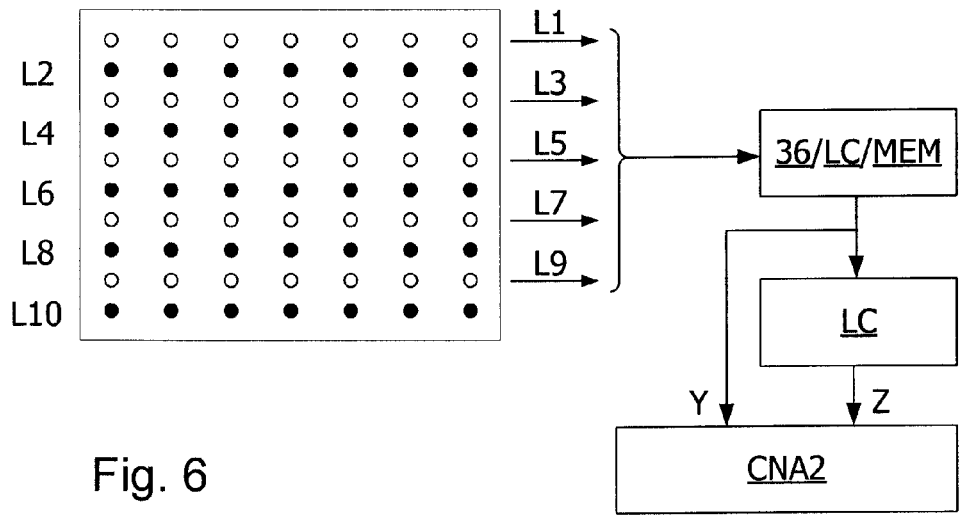
Fig. 6
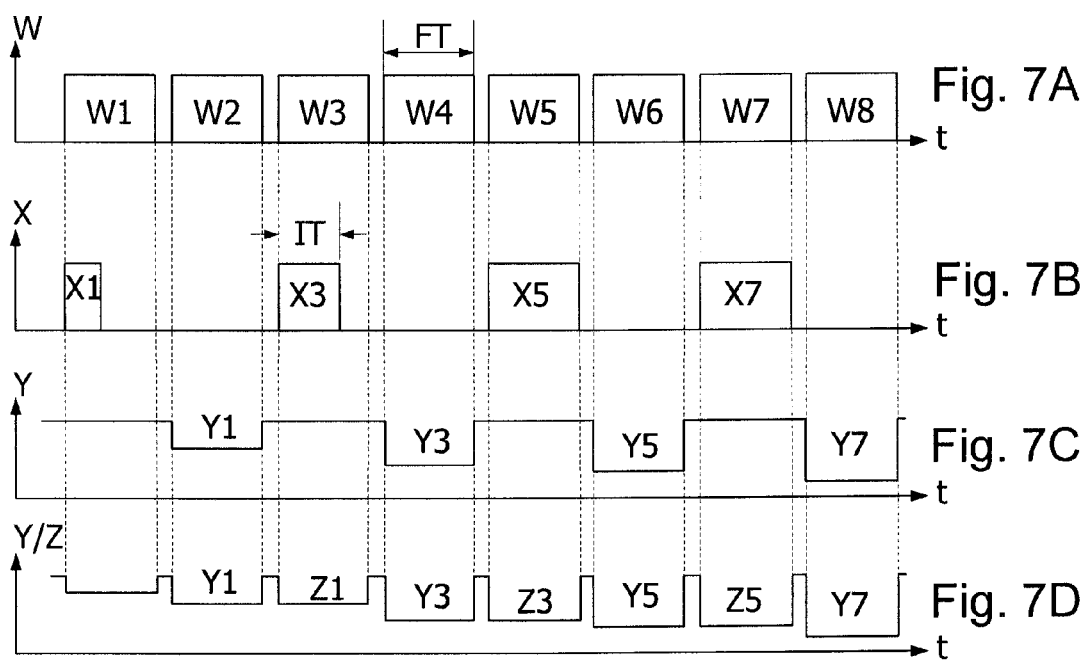
Fig. 7A
Fig. 7B
Fig. 7C
Fig. 7D

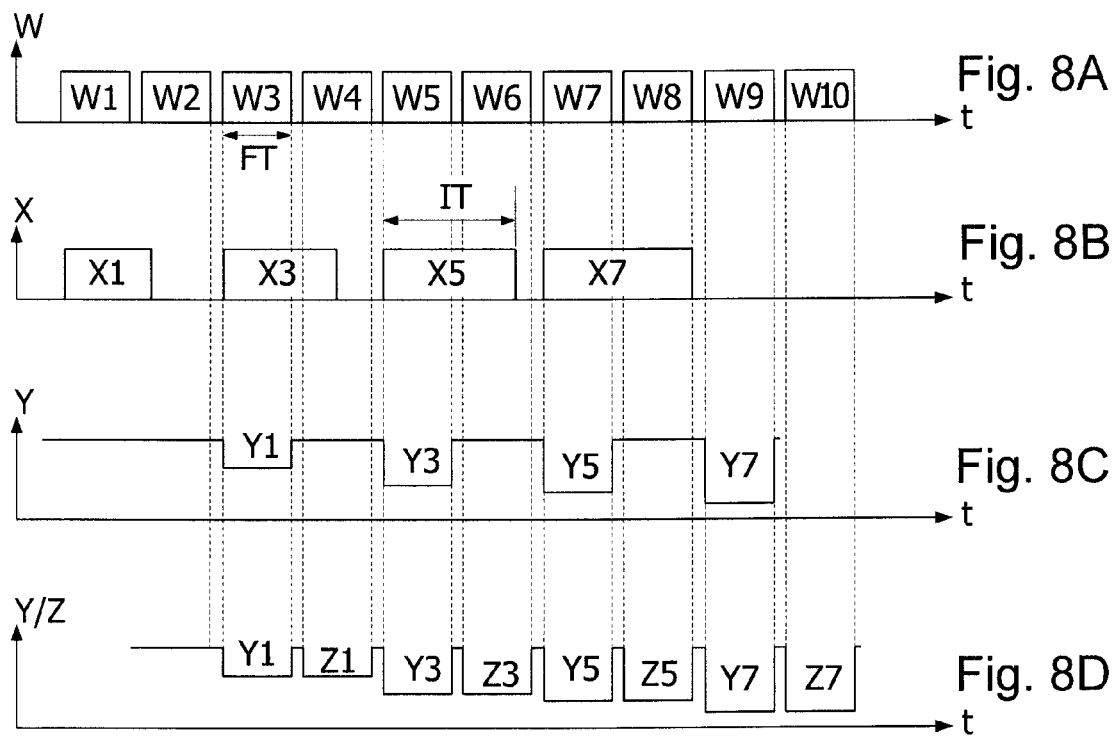
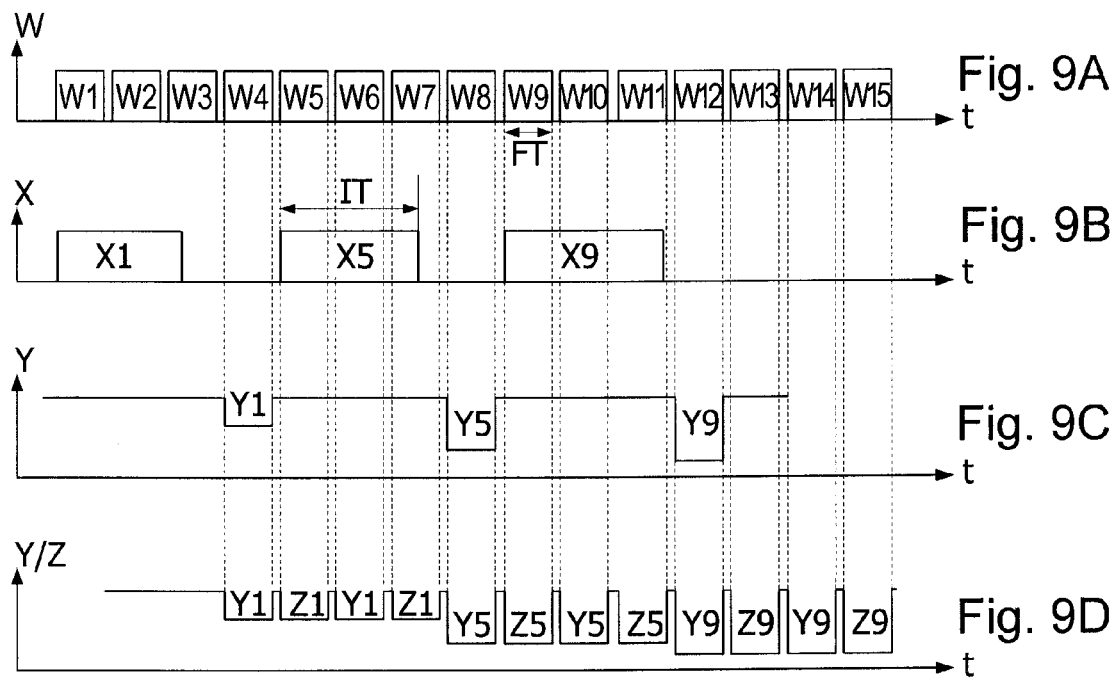

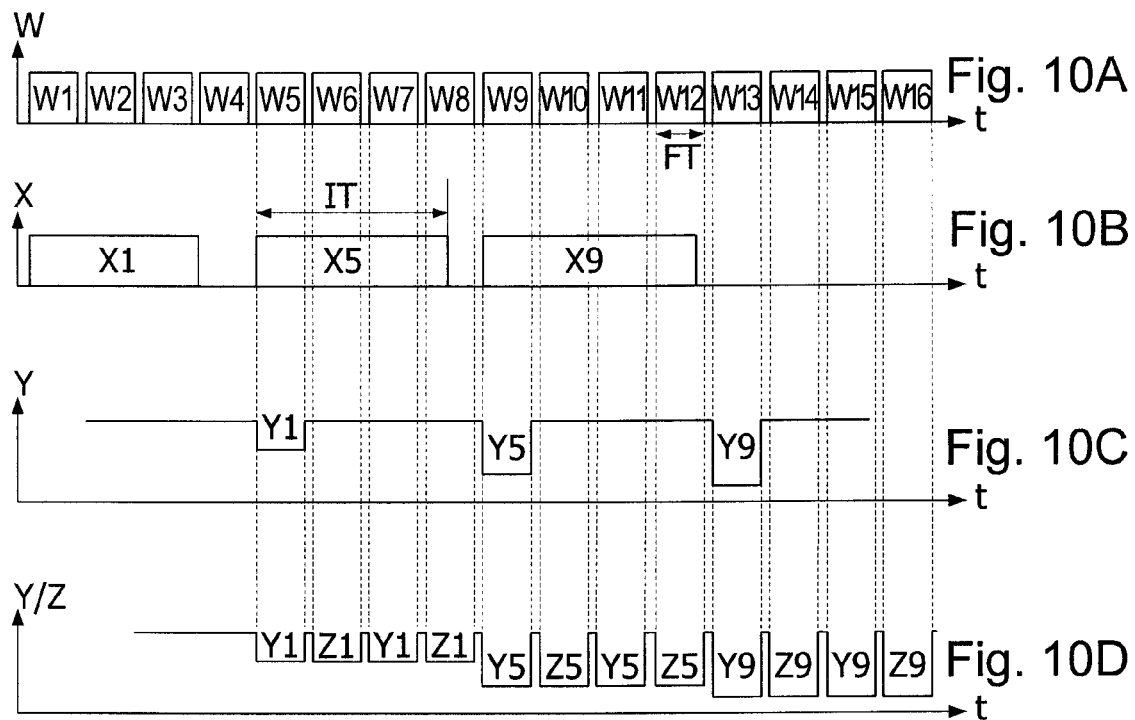
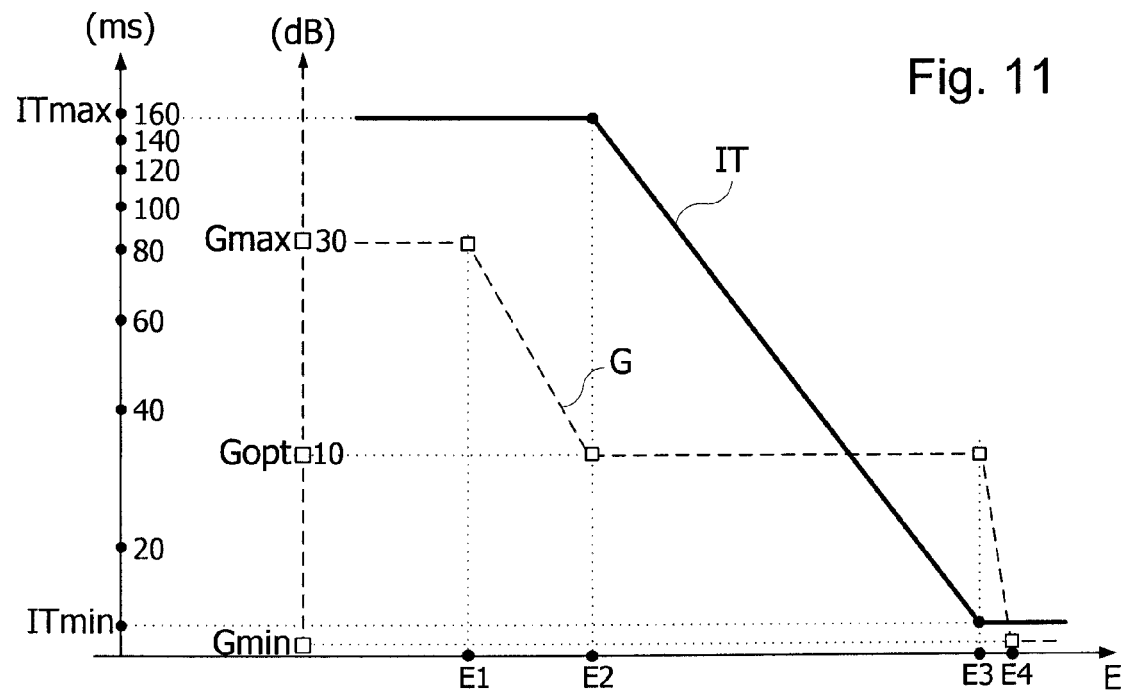

PROCESS OF REAL TIME ADJUSTMENT OF THE SENSITIVITY OF A VIDEO IMAGE SENSOR OF A VIDEOENDOSCOPIC PROBE

The present invention relates to a method for processing images in real time, implemented in a video processor of videoendoscopic probe. The present invention applies particularly, but not exclusively, to videoendoscopic probes comprising a distal image sensor, for industrial purpose.

The term "videoendoscope" generally refers to an endoscopy system allowing the image of a target located in a dark cavity to be observed on a video screen. Such a system more usually comprises a videoendoscopic probe, and additional operating devices. The videoendoscopic probe usually comprises a distal tip, a usually flexible inspection tube, which distal end is attached to the distal tip, a control handle attached to the proximal end of the inspection tube, a lighting device for lighting the target observed, an image processing device, a visualization screen, a control key panel and a flexible umbilical cable which distal end is attached to the control handle.

The distal tip houses an objective and an optoelectronic device of small dimensions comprising in particular an image sensor associated to an interface circuit. The objective is associated to the image sensor so as to form an image on the photosensitive surface of the image sensor. The proximal end of the umbilical cable is provided with a multiple connector allowing the probe to be connected to an additional operating device. The lighting device generally comprises a beam of lighting fibers successively housed in the umbilical tube, the control handle, and the inspection tube. The distal end of the beam of lighting fibers is integrated into the distal tip, to light the target. The proximal end of the beam of lighting fibers is housed into the multiple connector of the umbilical cable to be connected to a light generator. The image processing device comprises a video processor which may be housed in the control handle. The video processor is then linked to the distal image sensor by a multicore electric cable housed in the inspection tube. The video processor simultaneously acts on the synchronization of the image sensor and the amplitude of the unprocessed analog signal supplied by the latter. The video processor is configured to transform into a useful video signal the analog signal supplied by the distal image sensor. To that end, the video processor is synchronized by an original setting according to the length and electrical features of the multicore cable. The visualization screen allows the useful video signal supplied by the image processing device to be viewed. It may be flat and embedded on the control handle. The control key panel allows the operation parameters of the image processing device to be set, and may also be embedded on the control handle.

Generally, videoendoscopic probes may also comprise a distal jointed tip deflection, and interchangeable optical heads which can be locked on the distal tip of the probe. The tip deflection allows the direction of the distal tip of the inspection tube to be modified. It is operated by mechanical means (controlled by two thumb wheels and two locking levers) or electromechanical means (controlled by a joystick) which may be integrated into the control handle. The interchangeable optical heads allow all or part of the following optical parameters to be modified: the field covered by the probe, the focusing distance, the depth of field, and the viewing direction.

The additional operating devices susceptible of being functionally associated to the proximal end of the umbilical cable of the videoendoscopic probe may comprise an electric power supply which comprises a storage battery, or a case which can be connected to a source of alternating or direct current. They may also comprise a light generator conventionally comprising a halogen or xenon lamp. They may also comprise a digital processing and image saving device comprising either a simple portable computer equipped with a video input, or a dedicated system which may be controlled locally from the control panel on the handle of the videoendoscopic probe.

The significant improvements recently observed in videoendoscopy result from the miniaturization of components which have made it possible to implement a lighting device comprising one or more electroluminescent diodes instead of remote lighting lamps, conventionally used in endoscopy. It has also become possible to integrate into the video processor one or more dedicated digital devices to manage in real time functions such as image freezing, image inversion, image saving and reading, managed by a signal processing processor.

The main practical limitation of videoendoscopic probes lies in the insufficient sensitivity of the distal image sensor, which results in the impossibility to obtain an image which can be used beyond a determined observation distance. This limitation is linked on the one hand to the insufficient number of lighting fibers susceptible of being integrated into a probe of small diameter, and on the other hand, to the low intrinsic sensitivity of the image sensor resulting from its technology and small dimensions, and to the low value of the optical opening of the distal objective of the probe resulting from the practical impossibility of associating to the objective a focusing setting device. Due to the low volume available in the distal tip, the image sensor is usually of the type "interline transfer three CCD sensor" which has a relatively low sensitivity. This insufficient sensitivity reveals to be much more obvious when the lighting device of the videoendoscopic probe implements an electroluminescent diode (LED) supplying a luminous flux lower than that supplied by a conventional xenon lamp. Very significant and fast variations of the luminosity of the images collected by the image sensor may also be observed. Indeed, the image sensor may very rapidly pass from darkness to dazzle according to whether the distal tip of the probe is near an obstacle or further.

In monochromatic video systems, it is known to improve the signal to noise ratio of the video signal supplied, by integrating several successive video frames during the observation of a still target. This solution is for example described in the application JP 11-289 530. However, this solution is limited in a color video system due to the difficulties of simultaneously processing the luminance and chrominance components by an algorithm for adding successive frames.

It is also known to use an automatic gain control device for controlling the amplification gain of the analog signal supplied by the image sensor. However, due to the length of the link between the image sensor and the video processor, and the lack of space in the distal tip to house an efficient interface circuit, the electrical signal is more "noisy" than in a conventional camera with an integrated CCD sensor. That is why the maximum gain of the automatic gain control device remains in practice limited to 20° dB. Beyond, the noise renders the image uncomfortable.

A first improvement regarding slaving the sensitivity of the video processor to the lighting intensity of the distal image sensor, has been brought by integrating into the video processor videoendoscopic probes a high speed shutter consisting in slaving the duration of the pulses of the integration clock signal of the image sensor to the lighting level of the latter. This device however reveals to be limited due to the fact that the duration of the pulses of the integration clock signal cannot be higher than the duration of a video frame, i.e. $\frac{1}{50}$ s in PAL standard and 1/60 s in NTSC standard. Beyond the maximum integration time, it reveals to be necessary to implement a slaved diaphragm, arranged in front of the lighting lamp, to measure the quantity of light transmitted by the lamp to the proximal end of the beam of lighting fibers of the videoendoscopic probe.

Another more significant improvement, regarding the increase in sensitivity, has been brought by the implementation of a low speed shutter consisting in "forcing" the integration clock signal so that the duration of its pulses is equal to an integer N times the duration of a frame, to duplicate N times the video frame resulting from the integration, and to slave the number N to the average amplitude of the luminance component of the video signal supplied by the video processor. Some image sensors (CCD progressive scan, CMOS sensors) may naturally operate in such a low speed mode. In videoendoscopy, that reveals to be delicate due to the technology of CCD sensors of small dimensions available on the market, unless implementing a complex electronic circuit upstream from the video processor.

It is also known to integrate into a video processor of videoendoscopic probe, an automatic gain control device, and high or low speed shutting, all these devices being controlled according to the analog frame signal supplied by the image sensor. High speed shutting is performed by the video processor, while low speed shutting is performed by a circuit processing the signal coming from the sensor, upstream from the video processor. This solution is not satisfying due to the presence of an operation discontinuity when passing between the low speed and high speed operating modes.

In practice, this architecture does not allow the sensitivity regulation to be smoothed, in particular at the limit between the low and high speeds. The result is that there is a luminosity jump in the images obtained when the video processor passes from the low speed mode to the high speed mode and vice-versa.

The patent application JP 11-289 514 describes a video processor of videoendoscopic probe comprising high speed and low speed shutting, and a selection device for selecting one or the other shutting as a function of the analog frame signal at the output of the image sensor. This solution also seems to introduce a luminosity jump when switching between the two shutting modes.

It may therefore be desirable to control in real time the image sensor, the amplification gain of the video signal and the shutting speed, as a function of the lighting level of the image sensor. It may also be desirable to optimally "smooth" the luminosity of the images supplied by the image sensor, despite very fast variations of the lighting level of the image sensor.

It may also be desirable to integrate into the shutting speed management device, all or part of the following functions:

It may also be wishable to integrate into the shutting speed management device, all or part of the following functions:

a function of continuously controlling the format of the image supplied by the video processor, and therefore providing the latter with a zoom function in real time, a function of freezing the image supplied by the video processor, and a function of horizontal and/or vertical inversion of the image supplied by the video processor, or a mirror function, useful when the distal tip of the videoendoscopic probe is provided with an objective which inverts the image, such as a lateral view objective.

Embodiments relate to a method for adjusting the sensitivity of an image sensor of videoendoscopic probe, the method comprising: adjusting an integration duration of the image sensor between a minimum integration duration and an image frame duration, receiving from the image sensor a frame signal, and amplifying the frame signal by applying an adjusted amplification gain between different minimum and maximum gain values. According to one embodiment, the method comprises for each frame of the frame signal: determining an average value of the frame signal, calculating a new integration duration as a function of the average value, and if the new integration duration is comprised between the minimum integration duration and a maximum integration duration higher than the frame duration, establishing the integration duration at the new integration duration and maintaining the amplification gain at a fixed value, and if the new integration duration is higher than the maximum integration duration, maintaining the integration duration at the maximum integration duration and adjusting the amplification gain between the fixed and maximum gain values as a function of the average value of the frame signal.

According to one embodiment, the method comprises maintaining the integration duration at the minimum integration duration and adjusting the amplification gain between the fixed and minimum gain values as a function of the average value of the frame signal, if the new integration duration is lower than the minimum integration duration.

According to one embodiment, the method comprises controlling the image sensor so that it supplies a frame every two pulses of a clock signal at the frame frequency, and generating, from a frame of the frame signal received from the image sensor, a following frame obtained by duplicating the frame received and performing a vertical shifting equal to half the time interval between two successive lines of the frame received.

According to one embodiment, the method comprises supplying, after a pulse of an integration signal having a duration equal to the integration duration, a number of pairs of frames equal to the number of pairs of frames comprised in the integration duration plus one.

According to one embodiment, adjusting the integration duration is performed as a function of a difference between the average value of the frame signal and a setpoint value.

According to one embodiment, the fixed gain value is chosen so as to obtain a maximum signal to noise ratio in the amplified frame signal.

According to one embodiment, the new integration duration is obtained by adding thereto a positive or negative integration duration difference, proportional to a difference between the average value of the frame signal and a setpoint value.

According to one embodiment, adjusting the integration duration is performed between 1° ms and 8 times the frame duration.

According to one embodiment, adjusting the amplification gain is performed between 2° dB and 30 dB.

Embodiments also relate to a video processor for videoendoscopic probe, associated to an image sensor, configured to implement the method such as previously defined.

According to one embodiment, the video processor comprises a logic circuit receiving digitized samples of the frame signal and configured to adjust the integration duration of the video sensor and the amplification gain so as to slave the average value of the frame signal to the setpoint value, and to supply digitized frame signals which average value is corrected, to a video signal processing processor configured to perform a chromatic process of the digitized frame signals.

According to one embodiment, the logic circuit is connected to a memory to memorize one or more digitized frames.

According to one embodiment, the logic circuit is configured to perform functions of zoom, and/or image freezing and/or image inversion.

According to one embodiment, the image sensor is of the type interline transfer CCD or CMOS.

Embodiments also relate to a videoendoscope comprising a video processor such as previously defined.

Figure 2:
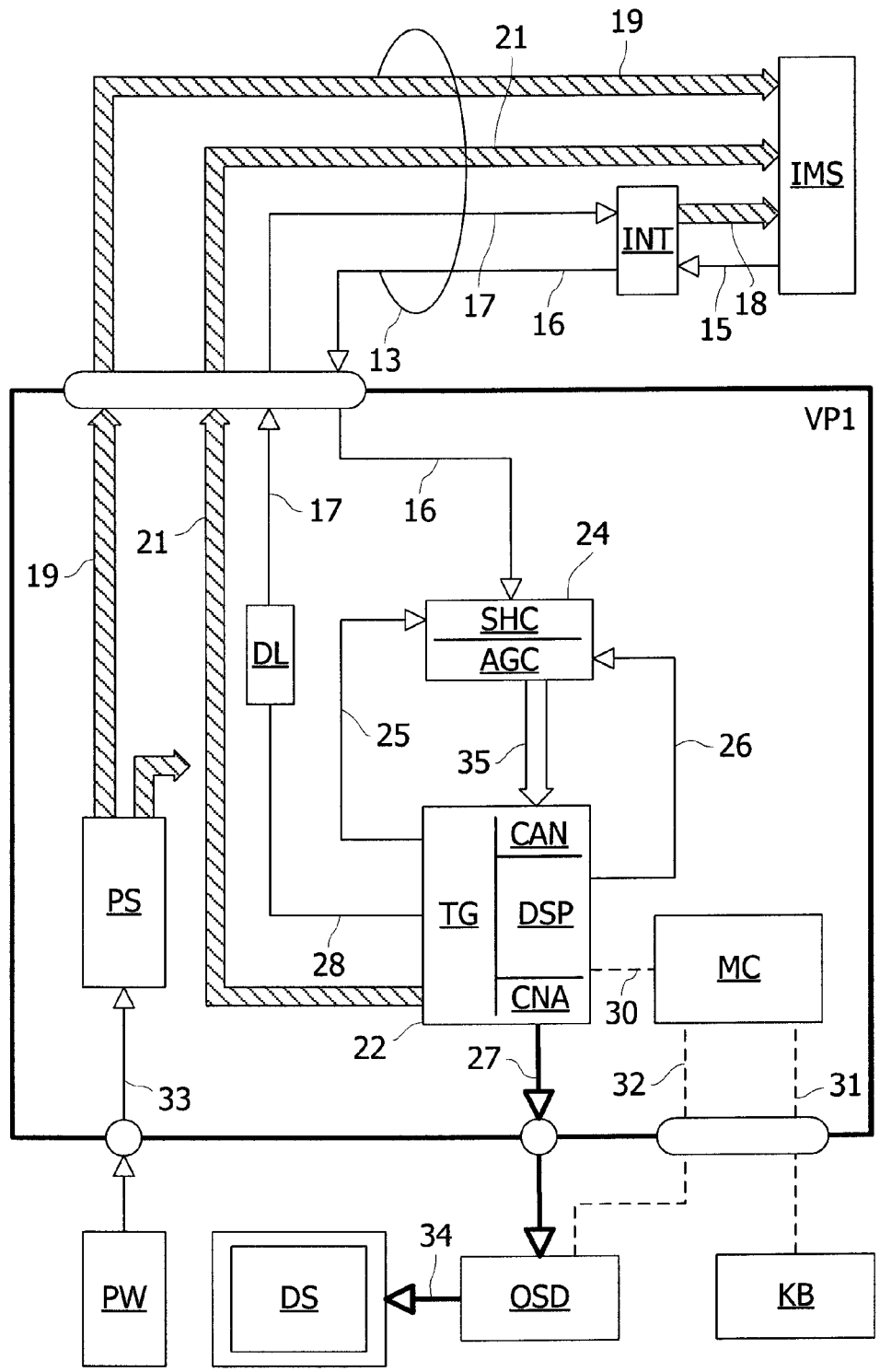
Figure 5:
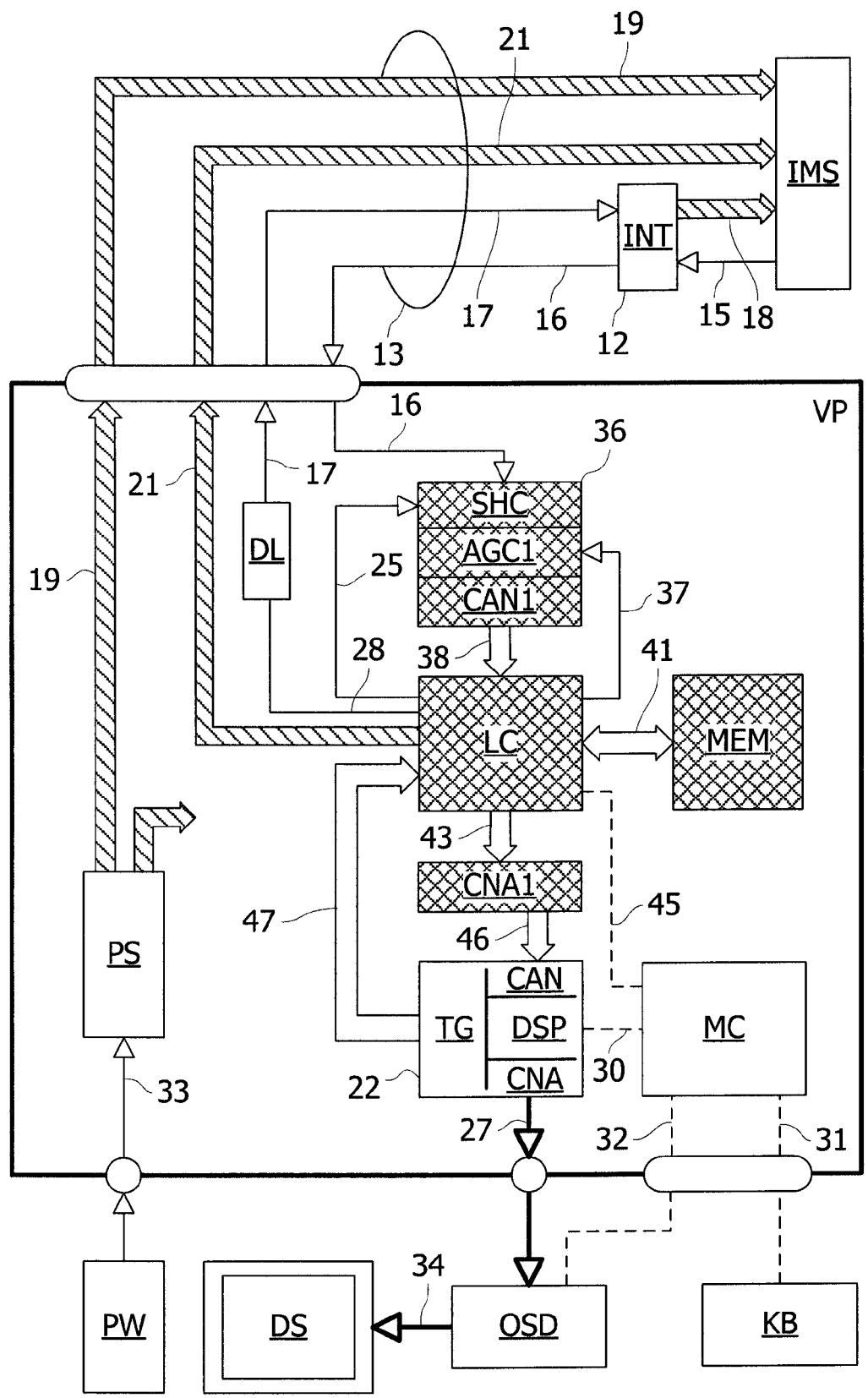
Figure 12:
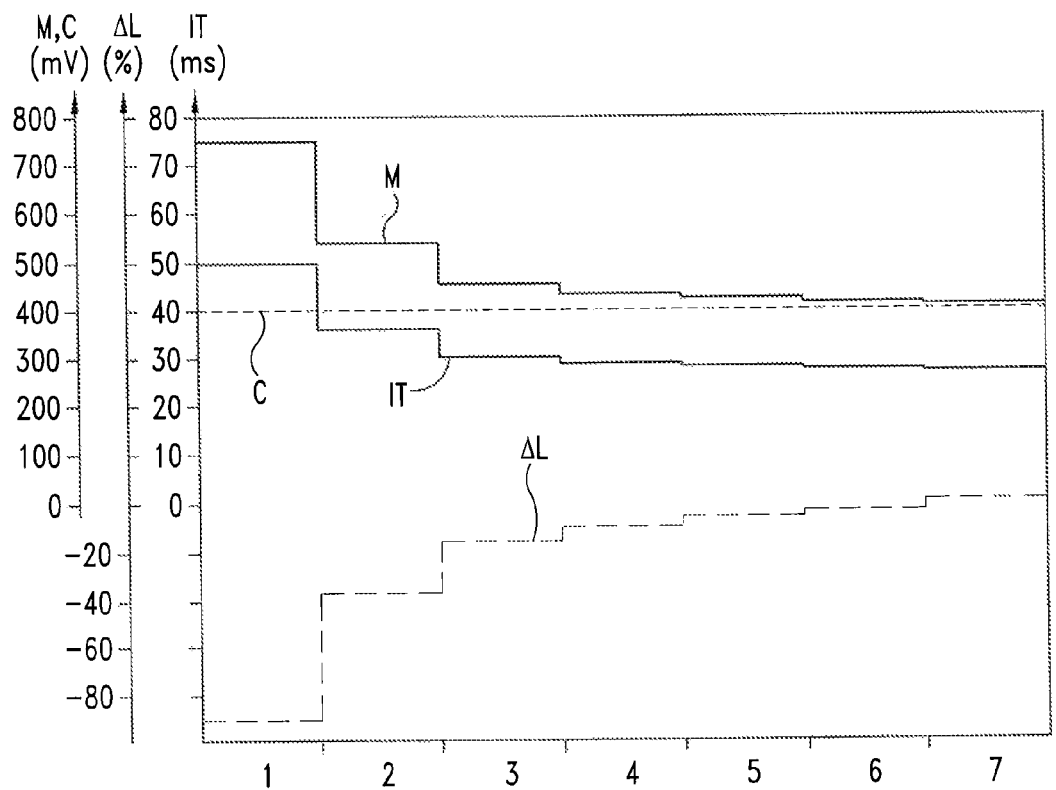
Figure 13:
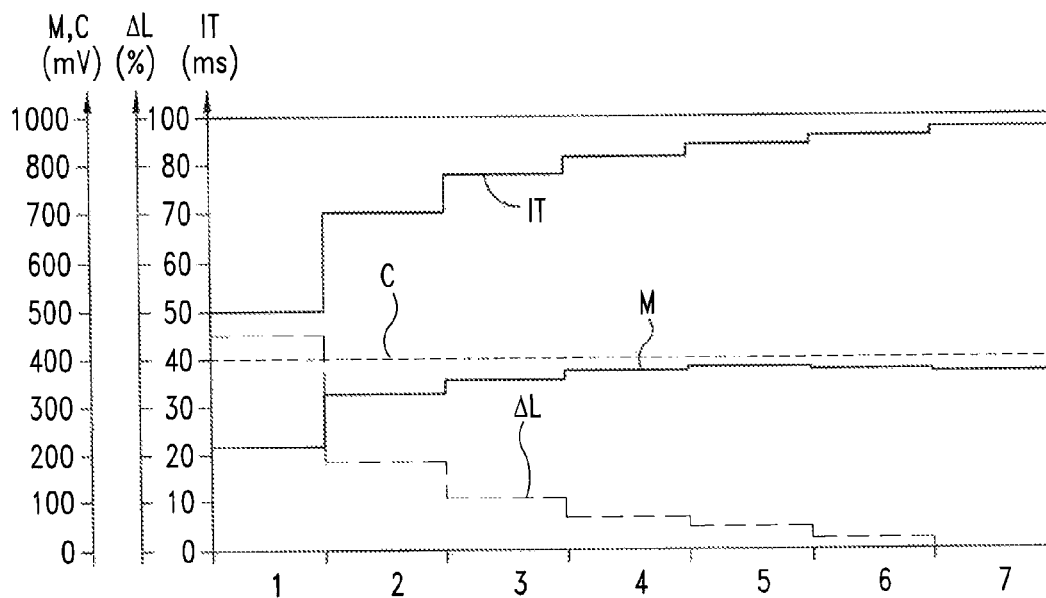

Embodiments of the invention will be described hereinafter, in relation with, but not limited to the appended figures wherein:

FIG. 1 shows in perspective an autonomous industrial videoendoscopic probe,

FIG. 2 schematically shows electronic circuits of a conventional videoendoscopic probe, FIG. 3 schematically shows an arrangement of the pixels of the image sensor in odd and even lines, FIGS. 4A to 4C show chronograms of signals circulating in the electronic circuits of FIG. 2, in a high speed shutting mode, FIG. 5 schematically shows electronic circuits of a videoendoscopic probe, according to one embodiment, FIG. 6 schematically shows an arrangement of the pixels of the image sensor in odd and even lines, FIGS. 7A to 7D show chronograms of signals circulating in the electronic circuits of FIG. 5, in a high speed shutting mode, according to one embodiment, FIGS. 8A to 8D show chronograms of signals circulating in the electronic circuits of FIG. 5, in another low speed shutting mode, according to one embodiment, FIGS. 9A to 9D show chronograms of signals circulating in the electronic circuits of FIG. 5, in another low speed shutting mode, according to one embodiment, FIGS. 10A to 10D show chronograms of signals circulating in the electronic circuits of FIG. 5, in another low speed shutting mode, according to one embodiment, FIG. 11 show variation curves of the integration duration and gain, as a function of the lighting of the photosensitive surface of the image sensor, according to one embodiment, FIGS. 12 and 13 are curves as a function of time showing the operation of the integration duration slaving function, according to one embodiment.

FIG. 1 shows an autonomous industrial videoendoscopic probe. The probe comprises a control handle 1, an inspection tube 2 which proximal end is connected to a distal face of the control handle 1. The distal end of the inspection tube 2 comprises a tip deflection 3 attached to a distal tip 4 housing an image sensor and an objective associated to the image sensor. A proximal face of the control handle 1 is attached to the distal end of an umbilical cable 9 which proximal end is connected to an electric power supply 10. The control handle 1 houses or supports:

an electronic card gathering a video processor VP and all its auxiliary functions, a light generator 8 comprising a diode LED lighting the proximal end of a beam of lighting fibers housed in the inspection tube 2, a display screen DS, for example of LCD type, a control key panel KB, and a tip deflection control device comprising two servomotors housed in a lower part of the control handle 1 and controlled by a joystick 6.

FIG. 2 shows the electronic circuits of a conventional videoendoscopic probe comprising an automatic gain control device and a high speed shutter. These circuits comprise:

a distal optoelectronic device comprising the image sensor IMS, for example of the type interline transfer three CCD, coupled to an interface electronic circuit INT, a video processor VP1, a multicore cable 13 linking the optoelectronic device to the video processor VP1, and ancillary devices, such as the control key panel KB, a foreground character generator OSD connected to the display screen DS, and an electric power supply device PW, the devices KB, OSD and PW being connected to the video processor.

The interface circuit INT is configured to amplify the analog frame signal 15 generated by the image sensor IMS and supply an amplified analog video frame signal 16. This amplification function may be performed by a simple transistor or an operational amplifier. The circuit INT also performs a synchronization function which receives a delayed fast clock signal or "pixel" 17, and shapes this signal and generates from the shaped signal all the horizontal clock signals 18 necessary for the synchronization of the image sensor IMS. Generally, the circuit INT is configured to reduce the number of "sensitive" unitary conductors integrated into the multicore cable 13. In these conditions, the multicore cable 13 gathers the electric links carrying the following signals:

direct voltages 19 generated by a power supply circuit PS integrated into the video processor VP1 and directly transmitted to the image sensor IMS, vertical clock signals 21 supplied by a clock signal generator TG integrated into the video processor VP1, and directly transmitted to the image sensor IMS, the delayed fast clock signal 17 generated by a phase shift circuit DL integrated into the video processor VP1, and transmitted to the interface circuit INT, and the amplified frame signal 16 supplied by the circuit INT.

The video processor VP1 comprises signal processing components 22, 24, the phase shift circuit DL, a control processor MC and the power supply circuit PS.

The component 24 comprises a sample and hold circuit SHC and an automatic gain control circuit AGC. The sample and hold circuit SHC samples the amplified frame signal 16 coming from the interface circuit INT, and supplies image signal samples comprising luminance and chrominance information. The circuit SHC is synchronized by a set of clock signals supplied by the clock signal generator TG and comprising in particular a fast sampling clock signal 25. The circuit AGC is configured to slave the amplitude of the samples supplied by the sample and hold circuit SHC to the average amplitude of a luminance signal generated by a signal processing digital processor DSP integrated into the component 22. The circuit AGC comprises for example an operational amplifier controlled by a set of signals 26 supplied by the processor DSP and comprising in particular an instantaneous voltage for controlling the operational amplifier and two voltages determining high and low limits of the excursion range of this control voltage. The circuit AGC supplies samples of image signal 35 which average amplitude of the luminance signal is slaved to an average value. The frame to signal 16 comprises even frames alternated with odd frames.

The component 22 gathers the clock signal generator TG, the signal processing processor DSP and an analog to digital converter CAN which function is to digitize the samples 35 supplied by the component 24. The processor DSP receives the digitized samples supplied by the converter CAN and generates therefrom a standardized video signal 27 for example composite or Y/C. The processor DSP is configured to perform in particular the following processing functions:

extracting the three chromatic components contained in the amplified frame signal 16, elaborating luminance and chrominance signals by dematrixing the three chromatic components, from two successive frames, correcting the luminance signal, comprising in particular: filtering, gamma corrections, outline corrections, correcting the chrominance signal, comprising in particular: filtering, gamma corrections, outline corrections, managing, as a function of the average amplitude of the luminance component of the video signal 27, the control signal transmitted to the circuit AGC, managing, as a function of the average amplitude of the luminance component of the video signal 27, an integration duration corresponding to the duration of the pulses of an integration clock signal transmitted to the image sensor IMS, this duration may vary from 0.1° ms (depending on the features of the image sensor) to the duration of a video frame, i.e. $\frac{1}{50}$ s in PAL standard, managing the white balance, digital to analog conversion CNA of the corrected digital luminance and chrominance signals, and corrections of the analog luminance and chrominance signals, comprising in particular: low-pass filtering, phasing, leveling, and all the operations for generating the standardized video signal 27 of composite or Y/C type.

The clock signal generator TG integrated into the component 22, is configured to supply in particular the different types of following signals:

several vertical synchronization signals 21 of the image sensor IMS (frame synchronization, frame reading, integration, . . . ).

a horizontal synchronization signal of the image sensor IMS, several video synchronization signals at the frame frequency (i.e. 50 Hz in PAL standard and 60 Hz in NTSC standard) and at the line frequency (i.e. 15625 Hz), directly transmitted to the signal processing functions integrated in the components 22 and 24, and a sampling clock signal 25 having a frequency identical to that of the horizontal synchronization signals of the image sensor IMS, this clock signal being used to synchronize the sample and hold circuit SHC.

Due to their low frequency (i.e. 50 Hz in PAL standard, and 60 Hz in NTSC standard), the vertical synchronization signals 21 may be directly transmitted to the image sensor IMS through the multicore cable 13, without being subjected to unacceptable phase shifts. On the contrary, the horizontal synchronization signals necessary to the image sensor IMS cannot be directly transmitted thereto, due to their high frequency (17 MHz in PAL standard), and due to the various phase shifts they would be subjected to when passing through the multicore cable 13. Thus, the phase shift circuit DL receives one horizontal synchronization clock signal 28 emitted by the clock signal generator TG and supplies the delayed pixel clock signal 17 which is directly transmitted to the interface circuit INT through the umbilical cable 13. The phase shift circuit DL may comprise a delay line subjecting the clock signal 28 to a phase difference calculated to compensate the sum of the delays resulting from the transit duration of the pixel clock signal 17 in the multicore cable 13, and the phase differences induced by the interface circuit INT, in the transmission of the signal 17 to the image sensor IMS, as well as in the transmission of the analog signal 15 generated by the image sensor.

The global video sensitivity of the video processor VP1 is managed by a sensitivity slaving device configured to regulate the average amplitude of the luminance component of the video frames 27 supplied by the processor DSP. The slaving device comprises the automatic gain control circuit AGC and a device for slaving the duration of the pulses of the integration clock signal transmitted to the image sensor IMS, hereinafter referred to as "integration duration". The slaving device only operates at high shutting speed, i.e. when the integration duration is inferior or equal to the duration of a video frame, hereinafter referred to as "frame duration" (i.e. $\frac{1}{50}$ s in PAL to standard and $\frac{1}{60}$ s in NTSC standard). The gain of the automatic gain control circuit AGC is controlled by the signals 26 which values are calculated by the processor DSP, as a function of a difference in relation to a nominal value corresponding to the average amplitude of the luminance component of the video frames 27. The duration of the pulses of the integration clock signal emitted by the generator TG and transmitted through the link 21 to the image sensor IMS, is also controlled by a signal elaborated by the processor DSP. It is to be noted that the maximum integration duration (equal to the frame duration) implemented in the processor VP1, characterizes a high speed shutting mode.

The control processor MC, for example of microcontroller type, is linked to a parametering interface of the processor DSP through a bidirectional series logic link 30, for example in TTL standard. The processor MC is also linked to the control keyboard KB through a matrix logic link 31, and to the foreground character generator OSD through a parallel logic link 32. A signal processing program, specific to the model of image sensor IMS implemented, is originally loaded into the signal processing digital processor DSP. Any setting which aim is to modify the parametering of this processing program may be made by an action on one of the keys of the control keyboard KB, which triggers the loading into the processor DSP of a series of elementary instructions previously stored in the processor MC and also specific to the model of image sensor implemented.

The power supply circuit PS gathers several switching mode power supplies supplying on the one hand direct power supply voltages for the different circuits and components of the video processor VP1, and on the other hand the direct voltages 19 for powering the image sensor IMS. The circuit PS is powered by a direct voltage 33 supplied by the power supply device PW connected to the proximal end of the umbilical cable 9 of the videoendoscopic probe.

The foreground character generator OSD receives the standardized video signal 27 supplied by the processor DSP and supplies a video signal 34 which may be visualized on the screen DS.

The video processor VP1 may be made using a "KIT HQ1" by SONY, complying with the interline transfer three CCD sensors by SONY. This kit comprises the component 22 commercialized under the reference "CXD 3172 AR" and the component 24 commercialized under the reference "CXA 3796".

FIG. 3 shows a distribution of the pixels of the image sensor IMS in even lines and odd lines. During the duration of a frame, the image sensor supplies to the video processor odd lines L1, L3, L5, . . . of pixels of the image sensor forming an odd frame Y. During the duration of the following frame, the image sensor supplies to the video processor even lines L2, L4, L6, . . . of pixels forming an even frame Z. The odd Y and even Z frames are alternately supplied to the component 22 which generates from the frames received video images in a composite standard format, each of these images consisting of an odd frame Y interlaced with an even frame Z.

FIGS. 4A to 4C show chronograms of signals circulating in the electronic circuits of FIG. 2, in a high speed shutting mode. FIGS. 4A and 4B show chronograms of vertical synchronization signals W and X of the image sensor IMS. The signal W (FIG. 4A), commonly referred to as "frame clock", is a clock signal at the frame frequency used in the vertical synchronization of the image sensor IMS and the processor VP. The signal W consist of a series of frame clock pulses W1, W2, W3, W4, W5, . . . of duration equal to the duration of a frame FT, at the end of each of which information contained in an image frame are available.

The signal X (FIG. 4B), commonly referred to as "integration clock", is the integration clock signal used in the vertical synchronization of the image sensor IMS. The signal X comprises a series of so-called "integration" pulses X1, X2, X3, X4, X5 which rising edge is synchronous with a rising edge of a pulse W1-W5, and which variable duration is equal to the integration duration IT. The signal X controls at each frame, the integration duration of the image sensor IMS, i.e. the time necessary to optimally load potential wells of the photosensitive layer of the image sensor.

The integration duration IT, or duration of the pulses of the integration clock signal X1-X5, is calculated at each frame by the component 22 as a function of the average amplitude of the digitized signal 38 supplied by the component 24. The duration IT may vary between a minimum value ITMIN (equal for example to $\frac{1}{6400}$ s in PAL standard) intended to compensate for an excessive lighting of the image sensor IMS, and a maximum value equal to the frame duration FT, when the sensor IMS is insufficiently lightened.

The signals Y and Z (FIG. 4C) alternately supply a frame Y1, Z2, Y3, Z3 synchronous with the signal W and are therefore active during each frame clock pulse W1-W5. An image frame Y1 of the signal Y appears after the falling edge of the pulse X1 of the signal X combined with the rising edge of the pulse W2 of the signal W. The average amplitude of the signal Y during the image frames Y1-Y3, Z1-Z3, before automatic gain correction, varies as a function of the lighting of the image sensor IMS and the integration duration IT. In the example of FIG. 4B, the integration duration IT increases at each pulse from X1 to X5. The result is that the average amplitude of the signals Y and Z also increases at each frame pulse W, if the lighting of the sensor remains substantially constant.

FIG. 5 shows the electronic circuits of a videoendoscopic probe, according to one embodiment. These electronic circuits implement a device for slaving the integration duration which may operate in high or low speed mode, and an automatic gain control device. These electronic circuits differ from those shown in FIG. 2, only by the video processor VP.

The video processor VP differs from the video processor VP1 in that it comprises a component 36 replacing the component 24, a logic circuit LC connected at the output of the component 36, a digital to analog converter CNA1 inserted between the circuit LC and the component 22, and a memory MEM connected to the logic circuit LC through a bidirectional link 41. The component 36 gathers the sample and hold circuit SHC, an automatic gain control circuit AGC1 and an analog to digital conversion circuit CAN1. The conversion circuits CAN1 and CNA1 are for example on 10 bits, which allows an impairment of the video signal to be avoided if the video signal supplied by the sensor is coded on 8 bits.

The logic circuit LC receives the set 47 of the synchronization signals 21, 28 supplied by the clock signal generator TG and distributes these clock signals toward the image sensor IMS. Thus, the circuit LC directly transmits to the image sensor via the multicore cable 13, the slow clock signals 21 (comprising in particular the integration clock signal X), designed for the vertical synchronization of the image sensor IMS. The circuit LC also transmits the fast clock signal 28 to the phase shift circuit DL, which supplies the delayed fast clock signal 17 which is transmitted via the multicore cable 13 to the interface circuit INT. Like in the electronic circuits of FIG. 2, the to interface circuit INT shapes the clock signal 17 and generates therefrom all the horizontal clock signals 18 necessary for the correct operation of the image sensor IMS. The logic circuit LC also transmits directly to the component 36 the synchronization clock signals thereof, and in particular the fast sampling clock signal 25 for synchronizing the sample and hold circuit is SHC integrated into this component.

In one embodiment, the logic circuit LC performs a function of slaving the sensitivity of the image sensor IMS, comprising an integration duration slaving function and a gain control function. The integration duration slaving function continuously regulates the duration of the integration pulses transmitted to the image sensor IMS. The regulation is made is a wide operating range comprised between a minimum value equal for example to 1 ms (intense lighting) and a maximum value (low lighting) equal for example to the duration of 8 video frames, i.e. 160° ms in PAL standard.

In addition, the sensitivity slaving function manages the automatic gain control circuit AGC1 as follows:
  in the operating range of the integration duration slaving function, the circuit AGC1 supplies a moderate constant gain Gopt, for example fixed at 10 dB, so as to limit noise,
  beyond the maximum value of the operating range of the integration duration slaving function: the circuit AGC1 operates automatically so as to supply a gain evolving between 10 dB and a minimum value Gmin for example fixed at 0 or 3 dB, and
  below the minimum value of the operating range of the integration duration slaving function: the circuit AGC1 operates automatically so as to supply a gain evolving between 10 dB and a maximum value Gmax for example fixed at 20 or 30 dB.

The logic circuit LC processes the digital samples 38 supplied by the component 36 according to whether the duration of the integration pulses transmitted to the sensor IMS is lower or higher than the duration of a video frame FT (i.e. 20 ms in PAL standard). In a first case, the duration of the integration pulses transmitted to the sensor IMS is comprised between the duration of a video frame FT and a minimum value ITmin fixed for example at 1 ms. The logic circuit LC then processes the digitized samples 38 of an odd frame Y<Q> by performing the following operations:
  transferring during the frame pulse W<Q+1> the odd digital frame Y<Q> to the logic circuit LC, and to the memory MEM,
  reading the odd digital frame Y<Q> stored in the memory MEM and creating a "pseudo" even frame Z<Q> by duplicating and vertical shifting (equal to half the time interval between two successive frame lines) of the frame Y<Q>, and
  transferring to the converter CNA1 the odd digital frame Y<Q> during the frame pulse W<Q+1> and the even digital frame Z<Q> during the frame pulse W<Q+2>.

In a second case, the duration of the integration pulses transmitted to the sensor IMS is comprised between the duration of a video frame FT and a maximum value ITmax which may be fixed at the duration of 8 successive video frames, i.e. 160 ms in PAL standard. The integration duration is comprised between the duration of N successive frames and the duration of N+1 successive frames, where N is an integer comprised between 1 and 7. In these conditions, the logic circuit LC processes the digitized samples 38 of an odd frame Y<Q> by performing the following operations:

transferring during the frame pulse W<Q+N> the odd digital frame Y<Q> to the logic circuit LC, and to the memory MEM, reading the odd digital frame Y<Q> stored in the memory MEM and creating a "pseudo" even digital frame Z<Q> by duplicating and vertical shifting (equal to half the time interval between two successive frame lines) of the odd digital frame Y<Q>.

transferring to the converter CNA1 the odd digital frame Y<Q> during the frame pulse W<Q+N>, transferring to the converter CNA1 the even digital frame Z<Q> during the frame pulse W<Q+N+1>, all the operations performed at the same time as transferring the odd frames Y<Q> and even frames Z<Q> to the converter CNA1, and repeating (N/2−1) times the previous operation during the frame pulses W<Q+N+2>/W<Q+N+3>, W<Q+N+4>/W<Q+N+5>, . . . .

The average value M of the digitized frame signal 35, determined for each signal frame 38, evolves physically inside a range of voltages limited by a minimum voltage (equal to 0 mV) corresponding to a lack of lighting of the to sensor IMS, and by a maximum voltage (for example equal to 300 mV) corresponding to a dazzle of the sensor IMS. The logic circuit LC manages the global sensitivity of the video processor VP by calculating at each frame supplied by the image sensor, a difference dL existing between an average value M of the digital frame signal 38 and a setpoint value C (for example is equal to 100 mV) corresponding to an optimum operation of the sensor IMS.

Knowing that the logic circuit LC can transmit to the sensor IMS integration pulses which duration can be continuously set between the minimum value ITmin and the maximum value ITmax equal to the duration of several successive video frames, the circuit LC performs the function of slaving the global sensitivity of the video processor VP by combining a priority integration duration slaving function, and a marginal gain control function. The integration duration slaving function transmits integration pulses to the sensor IMS which operates continuously as well at high shutting speeds (duration IT of the integration pulses lower than the duration of a video frame FT (1/50 s in PAL standard)), as at low shutting speeds (duration IT of the integration pulses higher than the frame duration FT). When the integration duration slaving function is active, the gain control device operates with a constant gain, fixed at a gain value (Gopt) low enough to obtain a satisfying signal to noise ratio. The integration duration slaving function maintains the average value M of the digital signals of the video frame 38 at a setpoint value C chosen so as to guarantee an optimum operation of the video signal process performed by the video processor VP.

The gain control function starts operating only when the integration duration IT becomes lower than a minimum threshold ITmin (1 ms for example) or higher than a maximum threshold ITmax (for example 160 ms corresponding in PAL standard to the duration of 8 successive video frames), or outside the practical operating range of the videoendoscopic probe.

In other words, the function of slaving the global sensitivity of the video processor VP is performed as follows:

if the integration duration IT is comprised between ITmin and ITmax, and if the relative deviation between the setpoint value C and the average value M of the frame digital signal 38, i.e. (C−M)/C, is higher in absolute value than a threshold (for example fixed at 1%), the circuit LC increases or decreases, as a function of the sign of the relative deviation, the integration duration IT, the logic circuit LC maintaining the gain of the circuit AGC1 at the fixed moderate value Gopt corresponding to an optimization of the signal to noise ratio, if the integration duration IT is higher than ITmax, (very low lighting of the sensor IMS), the logic circuit LC maintains at ITmax the integration duration and authorizes an automatic operation of the circuit AGC1 in a gain range comprised between the values Gopt and Gmax, when the integration duration is lower than ITmin, (dazzle of the sensor IMS—not frequent in endoscopy), the logic circuit LC maintains at ITmin the integration duration and authorizes an automatic operation of the circuit AGC1 in a gain range comprised between the values Gopt and Gmin.

Given what has been mentioned before, the sensitivity slaving function adjusts the global video sensitivity of the video processor VP by regulating the average value M of the video frame digital signals 38. This regulation is made continuously by adjusting the duration IT of the integration pulses transmitted to the image sensor. The result is high operation fluidity. The sensitivity slaving function thus has an identical operation in low and high shutting speeds, which allows any disturbance or luminous intensity jump at the limit of these two speed ranges to be avoided. In the operating ranges at low and high shutting speeds, the gain applied to the video frame analog signals supplied by the sensor IMS is low enough to avoid any deterioration of the signal to noise ratio. In these operating ranges, the video frame analog signals are maintained at a fixed level complying with an optimal operation of the video signal process performed by the processor VP. In addition, all the existing functions of correcting and optimizing the video images may still be performed by a conventional video signal processing device.

The component 36 of the video processor VP may be made using a circuit commercialized under the reference "NXP TDA87". The logic circuit LC may be made using a circuit of FPGA type commercialized under the reference "ALTERA CYCLONE 3". The component 22 may be made using a circuit commercialized under the reference "CXA 3796". The memory MEM may be of RAM type of a capacity of 16 Mbits. The digital to analog converter CNA1 may be of 10 bits.

FIG. 6 schematically shows the "pixel" structure of the image sensor IMS, to show a principle of acquisition of the analog frame signals supplied by the sensor IMS. The "pixel" structure of the sensor IMS comprises an alternated succession of lines of odd pixels L1, L3, L5, . . . and lines of even pixels L2, L4, L6, . . . . In one embodiment, the acquisition, by the video processor VP, of the analog signals generated by the image sensor only concerns frames consisting of lines of pixels of a same given parity. These frames are hereinafter qualified as "native". In the example of FIG. 6, the native frames are the odd frames. The odd frames are in these conditions processed in the circuits 36 and LC, before being transmitted in digital form Y to the converter CNA1.

During a frame synchronization pulse, the component 36 transmits an odd native frame Y to the circuit LC which is transmitted to the circuit CNA1. During the following frame synchronization pulse, the circuit LC generates and transmits to the circuit CNA1 a "pseudo" even frame Z, by duplicating the odd frame Y and performing a vertical shifting (equal to half the time interval between two successive lines of frame) of the lines of the frame Y.

Fires 7A-7D, 8A-8D, 9A-9D and 10A-10D show, at different operating phases of the integration duration slaving device IT, the chronograms of the frame clock signal W (FIGS. 7A, 8A, 9A and 10A), of the integration clock signal X (FIGS. 7B, 8B, 9B and 10B), of the odd frame signal Y (FIGS. 7C, 8C, 9C and 10C), and of the frame signal gathering the odd frames Y and "pseudo" even frames Z (FIGS. 7D, 8D, 9D and 10D).

The signal W comprises a series of pulses W1 ... W16 of fixed duration at the end of which the analog signals of the image frame concerned are available. In PAL standard, the frequency of the pulses W is equal to 50 Hz and the duration of these pulses substantially equal to 20 ms.

The signal X comprises a series of pulses X1 ... X9, each having a start edge synchronous with that of a pulse of the signal W and which variable duration IT controls the integration time of the image sensor IMS, i.e. the time necessary to optimally modify the potential wells of the photosensitive layer of the image sensor.

The signal Y comprises the digital odd frames transmitted by the logic circuit LC to the digital to analog converter CNA1. The signal Z comprises the "pseudo" digital even frames transmitted by the logic circuit LC to the converter CNA1.

FIGS. 7A-7D show the chronograms of the signals W, X, Y and Z during a phase in high speed shutting mode of the integration duration slaving function, i.e. a phase during which the duration IT of the integration pulses X1-X7 varies continuously (with a constant gain equal to Gopt) between the value ITmin (integration pulse X1) and a maximum value substantially equal to the duration FT of a frame (integration pulse X7).

The acquisition of the odd frames Y1, Y3, Y5, Y7, ... obtained after the integration pulses X1, X3, X5, X7, ... and their transmission to the digital to analog converter (CNA1), are synchronized by even frame pulses W2, W4, W6. The generation (by duplicating and vertically shifting the odd frames Y1, Y3, Y5 ... ), of the "pseudo" digital even frames Z1, Z3, Z5, ... and their transmission to the converter CNA1 are synchronized by odd frame pulses W3, W5, W7 ....

FIGS. 8A-8D show chronograms of the signals W, X, Y and Z during a first specific phase of the low speed shutting mode of the integration duration function. During this phase, the duration IT of the integration pulses X1-X7 varies continuously (with a constant gain equal to Gopt) from a minimum value equal to the duration of a frame FT to a maximum value equal to the duration of two successive frames (i.e. 2×FT). The acquisition of the odd signal frames Y1, Y3, Y5, ... generated by the integration pulses X1, X3, X5, ... and their transmission to the converter CNA1 are synchronized by the frame pulses W3, W5, W7, ....

The generation (by duplicating and vertically shifting the odd frames Y1, Y3, Y5, ... ) of the "pseudo" digital even frames Z1, Z3, Z5, ... and their transmission to the converter CNA1 are synchronized by the frame pulses W4, W6, W8.

FIGS. 9A-9D show a second specific phase of the low speed shutting mode of the integration duration slaving function. During this second phase, the duration IT varies continuously (with a constant gain equal to Gopt) from two to three times the frame duration FT. The acquisition of the native odd signal frames Y1, Y5, Y9, ... generated by the integration pulses X1, X5, X9, ... and their transmission to the converter CNA1 are synchronized by the frame pulses W4, W8, W12, .... This process is to duplicated in synchronism with the frame pulses W6, W10, W14, ....

The generation (by duplicating and vertically shifting the native digital even frames Y1, Y5, Y9..., ... ) of the "pseudo" digital even frames Z1, Z5, Z9, ... and their transmission to the converter CNA1 are synchronized by the frame pulses W5, W9, W13, ....

This process is also duplicated in synchronism with the frame pulses W7, W11, W15, ....

FIGS. 10A-10D show a third specific phase of the low speed shutting mode of the integration duration slaving function. During this phase, the integration duration IT varies continuously (with a constant gain equal to Gopt) from three to four times the duration of a frame. During this phase, the converter CNA1 receives the same frames as in FIGS. 9A to 9D, but delayed by a frame pulse in relation to the signal W.

FIGS. 7A to 10D therefore reveal that the integration duration slaving function may adjust continuously the integration duration IT between the duration ITmin (for example 1 ms) and a duration equal to four times the duration of a frame FT (i.e. 80 ms in PAL standard), and with a constant gain equal to Gopt. When the integration duration IT is comprised between ITmin (=1 ms) and twice the frame duration FT (FIGS. 7A to 8D), the frame refresh frequency corresponds to the standard frequency, i.e. 50 Hz in PAL standard. When the integration duration IT is comprised between two and four times the frame duration FT (FIGS. 9A to 10D), the frame refresh frequency corresponds to the standard frequency divided by two, i.e. 25 Hz in PAL standard. Thus, when the integration duration IT becomes higher than twice the duration of a frame FT, the video frame refresh frequency may become visually disturbing. More globally, the frames are supplied by pairs after a pulse of the integration signal in a number of pairs equal to the number of pairs of frames comprised in the integration duration plus one.

In one embodiment, two operating modes of the electronic shutter may be provided, which correspond to two ranges of integration speeds, i.e. for example, a "standard" mode and a "boost" mode. In the "standard" mode, the integration duration IT may be adjusted in a range going from ITmin to the duration of four frames (i.e. from 1 ms to 80 ms in PAL standard), corresponding to a minimum frame refresh frequency of the standard frequency divided by two (25° Hz in PAL standard). In the "boost" mode, the integration duration IT may be adjusted in a range going from ITmin (i.e. for example 1 ms) to the duration of six frames (i.e. 120 ms in PAL standard) or eight frames (i.e. 160° ms in PAL standard), corresponding to a minimum frame refresh frequency of the standard frequency divided by three (16.66° Hz in PAL standard) or four (12.5° Hz in PAL standard).

It is to be noted that the processor DSP of the component 22 may perform using its own structure functions of managing the gain and the high speed shutting mode. If this is the case, these functions may be deactivated to implement the slaving of the image sensor sensitivity, previously described. The processor DSP may then perform only chromatic processing functions (extracting color components, elaborating and correcting the luminance and chrominance signals, white balance, ... ).

FIG. 11 shows the operation of the function of slaving the sensitivity of the image sensor IMS. FIG. 11 shows variation curves of the integration duration IT and the gain G applied by the circuit AGC1, as a function of the lighting of the photosensitive surface of the image sensor IMS. The integration duration IT is susceptible of varying from ITmin (for example equal to 1 ms) to ITmax (for example equal to 8 times the duration of a frame FT, i.e. 160 ms in PAL standard). The gain G, applied by the automatic gain control circuit AGC1 receiving the analog signal generated by the image sensor IMS, is susceptible of evolving between Gmin, for example, 2 dB and Gmax for example equal to 30 dB. The global sensitivity slaving range is comprised between lightings E1 and E4, and comprises a main slaving range between lightings E2 and E3 and two auxiliary slaving ranges between the ranges E1 and E2 and between the ranges E3 and E4.

In the main range between the lightings E2 and E3, the integration duration IT varies from ITmin (for example 1 ms) for the higher lighting value E3, to ITmax (for example 8 times the duration of a frame FT) for the lower lighting value E2. In this range, the circuit AGC1 is controlled so that the gain G is fixed at the gain value Gopt for example equal to 10 dB. In the low lighting range between the lightings E1 and E2, the integration duration IT remains constant and equal to ITmax, while the circuit AGC1 is active to automatically adjust the gain G between the values Gopt and Gmax for example equal to 30 dB. In the high lighting range, between the lightings E3 and E4 (very rare in videoendoscopy), the integration duration IT is maintained constant and equal to ITmin, while the circuit AGC1 is active to automatically adjust the gain G between the values Gopt and Gmin (for example equal to 2 dB).

In the main range (between the lightings E2 and E3), the circuit LC may implement the following regulation law:

$$dIT = dK \cdot IT/M \tag{1}$$

where dIT is a (positive or negative) adjusting difference to be added to the integration duration IT, M is the average value of the digital frame signal 35, and dK is a luminance absolute correction value. When the optimum gain Gopt is fixed at 10 dB, the values of luminance absolute correction dK, and of integration duration dIT to be used may be those indicated in the following Table 1:

TABLE 1

| Case # | ΔL | dK | dIT |
|---|---|---|---|
| 1 | \|ΔL\| ≥ 25% | 60% dL | 60% IT (C − M)/M |
| 2 | 25% > \|ΔL\| ≥ 5% | 40% dL | 40% IT (C − M)/M |
| 3 | 5% > \|ΔL\| ≥ 1% | 2% M sgn(ΔL) | 2% IT sgn(ΔL) |
| 4 | \|ΔL\| < 1% | 0 | 0 | where ΔL=dL/C is a relative luminance difference in %, |ΔL| is the absolute value of the difference ΔL, dL is an absolute luminance difference equal to C−M, C is the luminance setpoint value and sgn(ΔL) is the sign of ΔL. Thus, in a first case, when the relative difference in absolute luminance value |(L| is higher than 25%, the adjusting difference dIT of the integration duration is fixed at 60% of the integration duration multiplied by the absolute luminance value dL divided by the average value M of the digital frame signal 38. In a second case, when the relative difference in absolute luminance value |ΔL| is comprised between 25% and 5%, the adjusting difference dIT of the integration duration IT is fixed at 40% of the integration duration multiplied by the absolute luminance difference dL divided by the average value M of the digital frame signal 38. In a third case, when the relative difference in absolute luminance value |ΔL| is comprised between 1% and 5%, the adjusting difference dIT of the integration duration IT is fixed at 2% of the integration duration IT. In a fourth case, when the relative difference in absolute luminance value |ΔL| is lower than 1%, the duration IT is not modified.

Regulation scenarios complying with the regulation defined by the Table 1, are shown in FIGS. 12 and 13 which show variation curves of the average value M and setpoint value C, of the relative lighting difference ΔL and the integration time IT, during several pairs of successive frames. The digital values of the integration time IT correspond to the PAL standard. FIG. 12 shows a regulation scenario in the case of "over-lighting", i.e. when the average value M is higher than the setpoint value C. In this scenario, the low speed shutting mode remains active (integration duration IT>20 ms in PAL standard) and the relative lighting difference ΔL remains negative. The corrections applied to the integration duration IT are therefore negative, and therefore make the integration duration decrease. During a first pair of frames, the integration duration IT is equal to 50 ms corresponding to a low speed shutting mode in which the frame refresh frequency is at 25 Hz (integration duration IT comprised between 2 and 3 times the frame duration FT equal to 20 ms). During the first pair of frames, the relative lighting difference |ΔL| is higher than 25%. The correction applied to the integration duration is therefore corrected in accordance with the case #1 of Table 1. During a second pair of frames, the integration duration IT has gone below twice the frame duration FT and therefore the frame refresh frequency has passed to 50 Hz. The relative lighting difference |ΔL| is still higher than 25%. The correction applied to the integration duration is therefore also calculated in accordance with the case #1 of Table 1. During the following pairs of frames, the frame refresh frequency remains at 50 Hz. During the third to fifth pairs of frames, the relative lighting difference |ΔL| is comprised between 25% and 5%. The correction applied to the integration duration IT is therefore calculated in accordance with the case #2 of Table 1. During the sixth and seventh pairs of frames, the relative lighting difference |ΔL| is lower than 5%. The correction applied to the integration duration IT is therefore calculated in accordance with the case #3 of Table 1. It may be observed in FIG. 12 that the difference ΔL converges towards 0, while the integration duration IT progressively decreases to converge to around 26 ms, and the average value M decreases to converge towards the setpoint value C while remaining higher than this value.

FIG. 13 shows a regulation scenario in the case of a "sub-illumination", i.e. when the average value M is lower than the setpoint value C. In this scenario, the low speed shutting mode remains active and the relative lighting difference ΔL remains positive. The corrections applied to the integration duration IT are therefore positive, and therefore make the integration duration increase. During a first pair of frames, the integration duration is equal to 50 ms corresponding to a low speed shutting mode in which the frame refresh frequency is at 25 Hz (integration duration IT comprised between 2 and 3 times the frame duration FT). During the first pair of frames, the relative lighting difference |ΔL| is higher than 25%. The integration duration IT is corrected in accordance with the case #1 of Table 1 so as to increase the difference ΔL. During a second pair of frames, the relative lighting difference |ΔL| has gone below 25%. The correction applied to the integration duration IT is therefore calculated in accordance with the case #2 of Table 1. The integration duration IT remains comprised between 2 and 3 times the frame duration FT and therefore the frame refresh frequency has remained at 25 Hz. During the third and fourth pairs of frames, the relative lighting difference |ΔL| is comprised between 25% and 5%. The correction applied to the integration duration IT is therefore calculated in accordance with the case #2 of Table 1. The duration IT thus passes above four times the frame duration FT. The frame refresh frequency is therefore fixed at 16.6 Hz. During the fifth to seventh pairs of frames, the relative lighting difference |ΔL| is lower than 5%. The correction applied to the integration duration IT is therefore calculated in accordance with the case #3 of Table 1. The duration IT remains between 4 and 5 times the frame duration FT. The frame refresh frequency therefore remains at 16.6 Hz. It may be observed in FIG. 13 that the difference ΔL converges to 0, while the integration duration IT increases to converge to around 90° ms, and the average value M increases to converge to the setpoint value C while remaining lower than this value.

It is to be noted in FIGS. 12 and 13 that slaving the integration duration IT defined in Table 1 does not produce oscillation of the average value M around the setpoint value C.

The slaving function performed by the circuit LC, which has just been described, thus performs regulating the sensitivity of the image sensor in the whole lighting range E1 to E4, and managing the shutting speed of the sensor IMS (integration duration) in the whole regulation range (between the lightings E2 and E3), including the high and low speeds. The result is a high operation fluidity, and above all a lack of discontinuity at the limit between the high and low speeds, i.e. a lack of luminosity jump during a transition between a shutting speed lower than the frame duration FT and a shutting speed higher than the duration FT.

The slaving function operates, in the regulation range (between the lightings E2 and E3), at a constant and moderate gain value. The result is an optimization of the signal to noise ratio.

The slaving function directly regulates the average value M of the amplitude of the digital frame signal 38. The result is that this regulation applies to a video signal which has not been subjected to any chromatic correction, susceptible of disturbing the regulation.

The slaving function is only based on the average value M of the amplitude of the digital signal of the odd (or even) frames, and generates by duplicating and vertical shifting even (or odd) frames. Frame generation by duplicating and shifting causes a loss of image definition which reveals to be practically imperceptible in videoendoscopy.

It is to be noted that the logic circuit LC supplies a frame signal in digital form 43. This signal 43 may be processed in the logic circuit LC, so as to perform additional processes in real time, such as zoom, image inversion, image freezing, . . . . Providing such additional processes in the circuit LC allows them to be simplified in relation to an implementation of these processes downstream from the processor DSP, and allows the data flows to be lightened.

It will appear clearly to those skilled in the art that the present invention is susceptible of various embodiments and applications. In particular, the invention is not limited to a video processor having the architecture shown in FIG. 5. In particular, the video processor VP of FIG. 5 comprises a double analog to digital and digital to analog conversion, allowing the component 22 of FIG. 3 to be kept, comprising a signal processing processor DSP. Admittedly, the processor DSP may be replaced by a totally digital signal processing processor having an input for receiving the digitized samples at the output of the logic circuit LC. The result is that the converter CNA1 is suppressed. If the signal processing processor used does not comprise any analog output and if such an analog output is required, a digital to analog converter connected to the digital signal output of the signal processing processor may be provided. It may also be provided that the video processor VP supplies digital images, so that the digital to analog conversion performed by the processor DSP may not be necessary.

In addition, in the previous description, it has been chosen as value for driving the slaving of the integration duration, the difference between the setpoint value C and the average value M of the digital frame signal. It may also be chosen as value for driving the slaving of the integration duration, the difference between the setpoint value C and the average value of the luminance component of the video signal supplied by the processor DSP. However, in this last case, the slaving driving signal may be disturbed by possible chromatic corrections not involved in the sensitivity of the image sensor, which is managed by the integration duration slaving.

In addition, it has been chosen in the previous description to only keep the odd frames at the output of the image sensor, and to generate the even frames by duplicating and shifting. Admittedly, it may also be considered to keep only the even frames and to reconstitute the odd frames from the even frames. In this regard, it may also be considered to keep all the frames in high speed shutting mode, and to only keep the even or odd frames in low speed shutting mode (integration duration IT lower than the frame duration FT). The choice of systematically discard one frame out of two at the output of the image sensor only results from a desire to simplify circuits, knowing that in videoendoscopy, this choice causes a practically imperceptible loss in the image definition. In addition, duplicating the video signals of odd frames Y and even frames Z, in low speed shutting mode, when the integration duration IT is higher than three times the duration of a frame FT, may not be necessary, if the image visualization device does not require receiving an image at the frame frequency.

In addition, the invention does not only apply to image sensors of interline transfer CCD type, but may also apply to any type of image sensor, such as CCD sensors of other types and CMOS sensors.

The invention claimed is:

1. A method for adjusting the sensitivity of an image sensor of videoendoscopic probe, the method comprising:
adjusting an integration duration of the image sensor between a minimum integration duration and an image frame duration,
receiving from the image sensor a frame signal,
amplifying the frame signal by applying an adjusted amplification gain between different minimum and maximum gain values,
for each frame of the frame signal, determining an average value of the frame signal, calculating a new integration duration as a function of the average value,
determining whether the new integration duration is comprised between the minimum integration duration and a maximum integration duration higher than the frame duration,
in response to determining that the new integration duration is comprised between the minimum integration duration and the maximum integration duration, establishing the integration duration at the new integration duration and maintaining the amplification gain at a fixed value,
determining whether the new integration duration is higher than the maximum integration duration, and
in response to determining that the new integration duration is higher than the maximum integration duration, maintaining the integration duration at the maximum integration duration and adjusting the amplification gain between the fixed and maximum gain values as a function of the average value of the frame signal.

2. The method according to claim 1, comprising maintaining the integration duration at the minimum integration duration and adjusting the amplification gain between the fixed and minimum gain values as a function of the average value of the frame signal, if the new integration duration is lower than the minimum integration duration.

3. The method according to claim 1, comprising controlling the image sensor so that it supplies a frame every two pulses of a clock signal at the frame frequency, and generating, from a frame of the frame signal received from the image sensor, a following frame obtained by duplicating the frame received and performing a vertical shifting equal to half the time interval between two successive lines of the frame received.

4. The method according to claim 1, comprising supplying, after a pulse of an integration signal having a duration equal to the integration duration, a number of pairs of frames equal to the number of pairs of frames comprised in the integration duration plus one.

5. The method according to claim 1, wherein adjusting the integration duration is performed as a function of a difference between the average value of the frame signal and a setpoint value.

6. The method according to claim 1, wherein the fixed gain value is chosen so as to obtain a maximum signal to noise ratio in the amplified frame signal.

7. The method according to claim 1, wherein the new integration duration is obtained by adding thereto a positive or negative integration duration difference, proportional to a difference between the average value of the frame signal and a setpoint value.

8. The method according to claim 1, wherein adjusting the integration duration is performed between 1 ms and 8 times the frame duration.

9. The method according to claim 1, wherein adjusting the amplification gain is performed between 2 dB and 30 dB.

10. A video processor for videoendoscopic probe, associated to an image sensor, configured to:
    adjust an integration duration of the image sensor between a minimum integration duration and an image frame duration,
    receive from the image sensor a frame signal,
    amplify the frame signal by applying an adjusted amplification gain between different minimum and maximum gain values,
    for each frame of the frame signal, determine an average value of the frame signal, calculate a new integration duration as a function of the average value,
    determining whether the new integration duration is comprised between the minimum integration duration and a maximum integration duration higher than the frame duration,
    in response to determining that the new integration duration is comprised between the minimum integration duration and the maximum integration duration, establishing the integration duration at the new integration duration and maintaining the amplification gain at a fixed value,
    determining whether the new integration duration is higher than the maximum integration duration, and
    in response to determining that the new integration duration is higher than the maximum integration duration, maintaining the integration duration at the maximum integration duration and adjusting the amplification gain between the fixed and maximum gain values as a function of the average value of the frame signal.

11. The video processor according to claim 10, configured to maintain the integration duration at the minimum integration duration and adjust the amplification gain between the fixed and minimum gain values as a function of the average value of the frame signal, if the new integration duration is lower than the minimum integration duration.

12. The video processor according to claim 10, configured to control the image sensor so that it supplies a frame every two pulses of a clock signal at the frame frequency, and generate, from a frame of the frame signal received from the image sensor, a following frame obtained by duplicating the frame received and performing a vertical shifting equal to half the time interval between two successive lines of the frame received.

13. The video processor according to claim 10, configured to supply, after a pulse of an integration signal having a duration equal to the integration duration, a number of pairs of frames equal to the number of pairs of frames comprised in the integration duration plus one.

14. The video processor according to claim 10, configured to adjust the integration duration as a function of a difference between the average value of the frame signal and a setpoint value.

15. The video processor according to claim 10, configured to fix the gain value so as to obtain a maximum signal to noise ratio in the amplified frame signal.

16. The video processor according to claim 10, configured to calculate the new integration duration by adding to the integration duration a positive or negative integration duration difference, proportional to a difference between the average value of the frame signal and a setpoint value.

17. The video processor according to claim 10, configured to adjust the integration duration between 1 ms and 8 times the frame duration.

18. The video processor according to claim 10, configured to adjust the amplification gain between 2 dB and 30 dB.

19. The video processor according to claim 10, comprising a logic circuit receiving digitized samples of the frame signal and configured to adjust the integration duration of the video sensor and the amplification gain so as to slave the average value of the frame signal to the setpoint value, and to supply digitized frame signals which average value is corrected, to a video signal processing processor configured to perform a chromatic process of the digitized frame signals.

20. The video processor according to claim 19, wherein the logic circuit is connected to a memory to memorize one or more digitized frames.

21. The video processor according to claim 19, wherein the logic circuit is configured to perform functions of zoom, and/or image freezing and/or image inversion.

22. The video processor according to claim 10, wherein the image sensor is of the type interline transfer CCD or CMOS.

23. A videoendoscope comprising a video processor associated to an image sensor, the video processor being configured to:
    adjust an integration duration of the image sensor between a minimum integration duration and an image frame duration,
    receive from the image sensor a frame signal,
    amplify the frame signal by applying an adjusted amplification gain between different minimum and maximum gain values, and
    for each frame of the frame signal, determine an average value of the frame signal, calculate a new integration duration as a function of the average value, and
    determining whether the new integration duration is comprised between the minimum integration duration and a maximum integration duration higher than the frame duration,
    in response to determining that the new integration duration is comprised between the minimum integration duration and the maximum integration duration, establishing the integration duration at the new integration duration and maintaining the amplification gain at a fixed value,
    determining whether the new integration duration is higher than the maximum integration duration, and in response to determining that the new integration duration is higher than the maximum integration duration, maintaining the integration duration at the maximum integration duration and adjusting the amplification gain between the fixed and maximum gain values as a function of the average value of the frame signal.

24. The videoendoscope according to claim 23, wherein the video processor is configured to maintain the integration duration at the minimum integration duration and adjust the amplification gain between the fixed and minimum gain values as a function of the average value of the frame signal, if the new integration duration is lower than the minimum integration duration.

25. The videoendoscope according to claim 23, wherein the video processor is configured to control the image sensor so that it supplies a frame every two pulses of a clock signal at the frame frequency, and generate, from a frame of the frame signal received from the image sensor, a following frame obtained by duplicating the frame received and performing a vertical shifting equal to half the time interval between two successive lines of the frame received.

26. The videoendoscope according to claim 23, wherein the video processor is configured to supply, after a pulse of an integration signal having a duration equal to the integration duration, a number of pairs of frames equal to the number of pairs of frames comprised in the integration duration plus one.

27. The videoendoscope according to claim 23, wherein the video processor is configured to adjust the integration duration as a function of a difference between the average value of the frame signal and a setpoint value.

28. The videoendoscope according to claim 23, wherein the video processor is configured to fix the gain value so as to obtain a maximum signal to noise ratio in the amplified frame signal.

29. The videoendoscope according to claim 23, wherein the video processor is configured to calculate the new integration duration by adding to the integration duration a positive or negative integration duration difference, proportional to a difference between the average value of the frame signal and a setpoint value.

30. The videoendoscope according to claim 23, wherein the video processor is configured to adjust the integration duration between 1 ms and 8 times the frame duration.

31. The videoendoscope according to claim 23, wherein the video processor is configured to adjust the amplification gain between 2 dB and 30 dB.

32. The videoendoscope according to claim 23, wherein the video processor comprises a logic circuit receiving digitized samples of the frame signal and configured to adjust the integration duration of the video sensor and the amplification gain so as to slave the average value of the frame signal to the setpoint value, and to supply digitized frame signals which average value is corrected, to a video signal processing processor configured to perform a chromatic process of the digitized frame signals.

33. The videoendoscope according to claim 32, wherein the logic circuit is connected to a memory to memorize one or more digitized frames.

34. The videoendoscope according to claim 32, wherein the logic circuit is configured to perform functions of zoom, and/or image freezing and/or image inversion.

35. The videoendoscope according to claim 23, wherein the image sensor is of the type interline transfer CCD or CMOS.

* * * * *